March 5, 1929. G. N. WOLFE 1,704,068
CHILD'S VEHICLE
Filed April 4, 1927
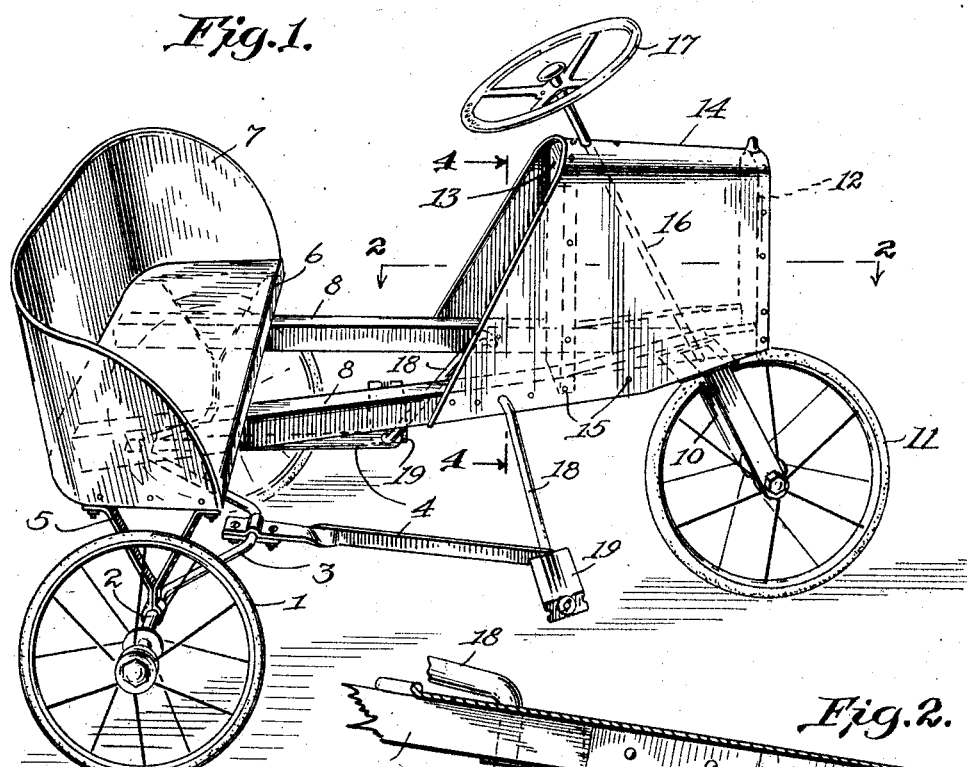
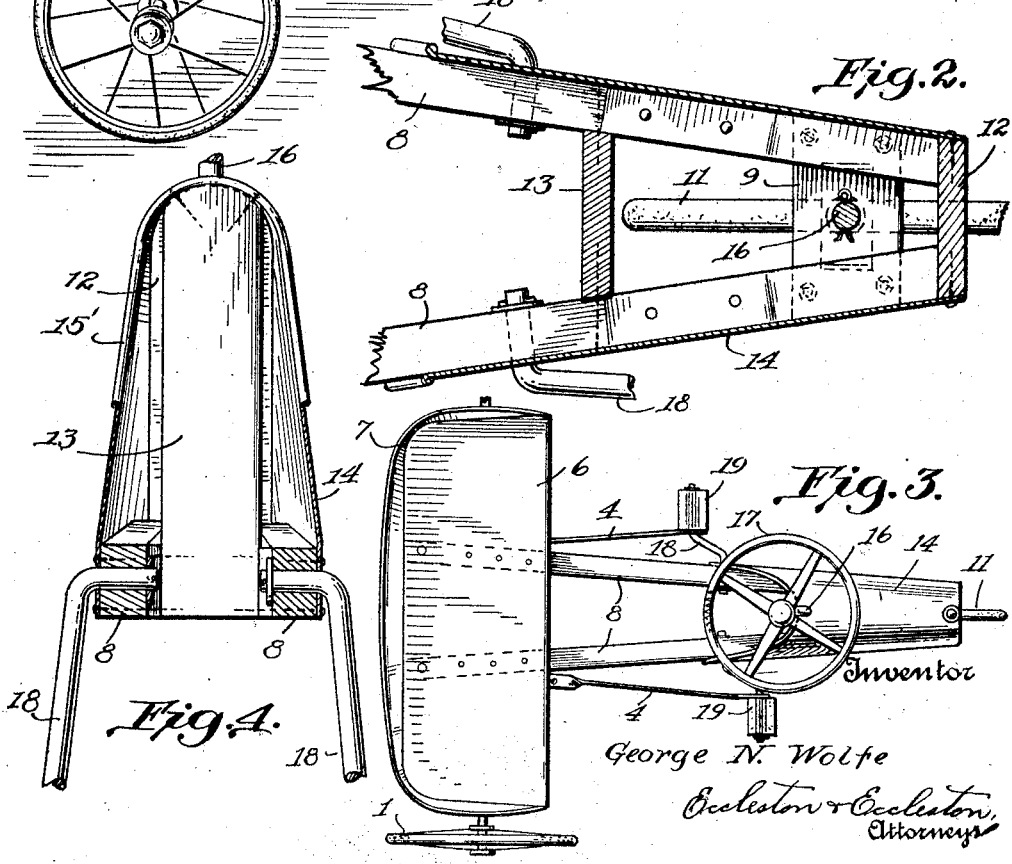
Inventor
George N. Wolfe
Eccleston & Eccleston,
Attorneys Patented Mar. 5, 1929.

1,704,068

UNITED STATES PATENT OFFICE.

GEORGE N. WOLFE, OF WASHINGTON, PENNSYLVANIA, ASSIGNOR TO SIDWAY-TOPLIFF COMPANY, OF WASHINGTON, PENNSYLVANIA.

CHILD'S VEHICLE.

Application filed April 4, 1927. Serial No. 180,390.

The present invention relates to children's vehicles and especially to devices of this type in simulation of automobiles which may be self-propelled and which therefore serve as exercising devices as well as pleasure vehicles for children.

An object of the invention resides in the construction of such a toy which is strong and durable in operation and yet comparatively simple and inexpensive in structure.

A further object of the invention consists in the provision of a child's vehicle which is neat and attractive in appearance and which is so constructed as to reduce to a minimum the possibility of injury to the child in its operation.

Other objects and advantages of the invention will be apparent from the following description when taken in connection with the accompanying drawing; in which Figure 1 is a perspective view of the improved toy automobile.

Figure 2 is a fragmentary horizontal section taken on line 2—2 of Figure 1.

Figure 3 is a plan view of the device with one of the wheels removed; and

Figure 4 is a vertical section taken on line 4—4 of Figure 1.

Referring to the drawing in greater detail the numeral 1 indicates the rear wheels of the child's vehicle which are mounted on the ends of the rear axle or crank shaft 2. This axle is rotated by means of the cranks 3 with which are associated the connecting rods 4 to be later described. Also mounted on the rear axle 2 as by means of brackets 5 is the seat 6 provided with the usual back and sides 7.

The frame of the vehicle is constituted by two bars 8. These bars are horizontally arranged and are spaced apart at their rear ends and secured to the bottom of the seat portion 6. These bars are inclined toward each other and are supported upon a base plate 9 resting on the upper portion of the fork 10 which carries the front wheel 11. Secured to the front ends of the bars 8 is a post 12 and spaced rearwardly therefrom and also secured to the bars 8 is a second post 13.

These posts form the support for a strip or plate of sheet metal which is adapted to be shaped into simulation of a hood of an ordinary automobile. This sheet of metal or the like is indicated by the numeral 14 and has its lower edges secured in any desired manner to the bars 8 as indicated by numeral 15 while the intermediate portion of the sheet or strip is supported upon the upper ends of the posts 12 and 13. The rear edge of the sheet 14 is provided with a bead 15' so as to prevent injury to the child operating the vehicle.

In further simulation of an automobile a steering post 16 extends through the base plate 9 and is fixed to the fork 10 which carries the front wheel 11. Mounted on the upper end of the steering post 16 is a steering wheel 17 by which the vehicle may be guided.

Pivotally mounted in the bars 8 and extending outwardly and downwardly therefrom are the foot levers 18 with which the connecting rods 4 are associated and foot pedals 19 are provided for operating these levers.

In the operation of the vehicle the child sits in the seat 6, guides the vehicle by means of the steering wheel 17, and propels it by a back and forth movement of the pedals 19. This operation of the machine in conjunction with the simple construction thereof practically eliminates any chance of injury to the occupant for the reason that the pedals are merely given a back and forth movement to propel the vehicle, thereby eliminating any liability of the child's feet becoming jammed between the pedals and a portion of the body of the vehicle.

Furthermore, the arrangement is such, due to the inclined positions of the bars 8 of the frame, that the child's legs straddle the frame when operating the pedals and are therefore entirely free of mechanism. Thus in the event that the vehicle should upset for any reason there is practically no danger of the child becoming entangled with parts of the vehicle.

From the foregoing description taken in connection with the accompanying drawing it will be apparent to those skilled in the art that I have devised an exceedingly simple and inexpensive construction of child's vehicle which is strong and durable in operation, which is neat and attractive in appearance and which practically eliminates all danger of injury to the child in the operation thereof.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include within the scope of the appended claim.

What I claim as new and desire to secure by Letters Patent is:

In a child's vehicle including a rear axle and a seat supported thereon, a frame comprising two bars having their rear ends spaced apart and secured to said seat, said bars sharply inclined toward each other and supported on a single wheel at the front of the vehicle, a narrow, upright post mounted at the forward end of said frame, a slightly wider post mounted on said frame rearwardly of the first-mentioned post, and a sheet of metal bent over the upper ends of said posts and overlapping and secured to the forward ends of said bars.

GEO. N. WOLFE.